United States Patent
Kurosawa et al.

(10) Patent No.: US 7,582,139 B2
(45) Date of Patent: Sep. 1, 2009

(54) METHOD FOR PROCESSING ORGANIC SOLVENT-CONTAINING AIR

(75) Inventors: Masaji Kurosawa, Tokyo (JP); Katsuhiro Yamashita, Tokyo (JP); Tomohiro Deguchi, Tokyo (JP)

(73) Assignee: Nichias Corporation, Tokyo (JP)

( * ) Notice: Subject to any disclaimer, the term of this patent is extended or adjusted under 35 U.S.C. 154(b) by 327 days.

(21) Appl. No.: 11/678,712

(22) Filed: Feb. 26, 2007

(65) Prior Publication Data

US 2007/0209510 A1 Sep. 13, 2007

(30) Foreign Application Priority Data

Mar. 7, 2006 (JP) .............................. 2006-061004

(51) Int. Cl.
 *B01D 53/06* (2006.01)
 *B01D 53/86* (2006.01)
 *F23G 7/07* (2006.01)

(52) U.S. Cl. .............................. 95/113; 95/123; 95/141; 423/245.3

(58) Field of Classification Search ................... 95/107, 95/113, 117, 121–123, 141, 143–145, 148; 96/125; 423/210, 245.1, 245.3
 See application file for complete search history.

(56) References Cited

U.S. PATENT DOCUMENTS 4,409,006 A * 10/1983 Mattia .......................... 95/113

| 5,176,798 | A | * | 1/1993 | Rodden ....................... 202/159 |
| 5,312,477 | A | * | 5/1994 | Minor ............................. 95/99 |
| 5,595,586 | A | * | 1/1997 | Sivavec ........................ 95/143 |
| 5,609,829 | A | * | 3/1997 | Lucas et al. ................. 422/110 |
| 5,695,546 | A | * | 12/1997 | Izumi et al. .................... 95/115 |
| 5,941,073 | A | * | 8/1999 | Schedler et al. .............. 60/687 |
| 2001/0009124 | A1 | * | 7/2001 | Suzuki et al. ................. 95/113 |
| 2005/0172805 | A1 | * | 8/2005 | Motono et al. ................ 95/113 |

OTHER PUBLICATIONS

U.S. Appl. No. 11/678,722, filed Feb. 26, 2007, Kurosawa et al.
U.S. Appl. No. 11/678,712, Feb. 26, 2007, Kurosawa et al.

\* cited by examiner

*Primary Examiner*—Frank M Lawrence
(74) *Attorney, Agent, or Firm*—Oblon, Spivak, McClelland, Maier & Neustadt, P.C.

(57) ABSTRACT

A method for processing an organic solvent-containing air capable of being operated in spite of a rapid fluctuation of the concentration of organic solvents in the air to be processed and capable of using a combustion furnace exhaust gas as an air for regenerating dehumidifying member is provided. The method comprises carrying out simultaneously and continuously a dehumidification step (a), an adsorption-removing step (b), an adsorbing member-regeneration step (c), a combustion step (d), and a dehumidifying member-regeneration step (e) comprising mixing the adsorption-treated air produced in the adsorbing-removing step (b) with a combustion furnace exhaust gas produced in the combustion step (d) to obtain a mixed gas, decomposing the organic solvents in the mixed gas by oxidation, and causing the resulting purified gas to flow through the dehumidifying member which has adsorbed moisture, thereby regenerating the dehumidifying member.

2 Claims, 3 Drawing Sheets

METHOD FOR PROCESSING ORGANIC SOLVENT-CONTAINING AIR

BACKGROUND OF THE INVENTION

1. Field of the Invention

The present invention relates to a method for continuously processing an organic solvent-containing air discharged from a production process, while supplying a dehumidified air to the production process. More particularly, the invention comprises simultaneously and continuously carrying out a dehumidification step of dehumidifying an air to be supplied to a production process by a dehumidifying member on which a dehumidification agent is supported, a dehumidifying member-regeneration step of regenerating the dehumidifying member which has adsorbed moisture, an adsorbing-removing step of removing organic solvents in the air to be processed by adsorbing the organic solvents in an adsorbing member containing an adsorbent such as zeolite supported thereon, an adsorbing member-regenerating step of regenerating the adsorbing member which has adsorbed the organic solvents, and a combustion step of burning the organic solvents in the air containing high-concentration organic solvents produced by regenerating the adsorbing member.

2. Description of Related Art

In production processes for manufacturing liquid crystals, semiconductors, LEDs, plasma displays, resins, coating materials, and the like and facilities for carrying out printing, coating, cleaning, and the like (hereinafter referred to from time to time as "production processes"), an external air and the like are dehumidified using a dehumidifying member to supply dehumidified air to the production processes and, at the same time, air containing organic solvents such as a halogenated hydrocarbon, toluene, and ethyl acetate (hereinafter referred to from time to time as "organic solvent-containing air") is discharged from the production processes. Since such organic solvents are harmful, the organic solvents in the air discharged from these processes must be removed by an appropriate method.

A conventional method for processing an organic solvent-containing air comprises an adsorbing-removing step of removing the organic solvents in the air by causing the air to flow through an adsorbing member, an adsorbing member-regenerating step of regenerating the adsorbing member by causing a regeneration air to flow though the adsorbing member which has adsorbed the organic solvents, and a combustion step of feeding a concentrated air produced in the adsorbing member-regeneration step to a combustion furnace and burning the organic solvents in the concentrated air. The adsorbing-removing step, regeneration step, and combustion step are carried out simultaneously and continuously using an adsorption apparatus equipped with an adsorbing member containing an adsorbent such as zeolite supported thereon and a processing system for an organic solvent-containing air equipped with a combustion furnace packed with an oxidation catalyst.

Figure 5:
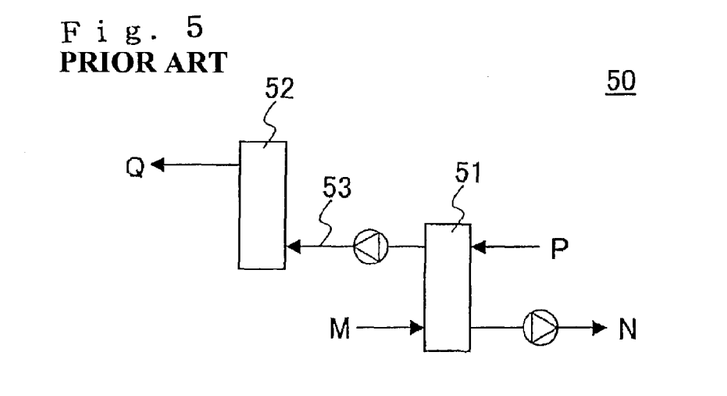
FIG. 5 is a flow chart showing a conventional method for processing an organic solvent-containing air.

A conventional method for processing an organic solvent-containing air will be described with reference to FIG. 5. FIG. 5 is a flow chart showing a conventional method for processing an organic solvent-containing air. A conventional processing system 50 for an organic solvent-containing air shown in FIG. 5 has an adsorber 51, which is equipped with an adsorbing member divided into an adsorption zone and a regenerating zone, and a combustion furnace 52 packed with an oxidation catalyst. In the adsorber 51, the organic solvents in the air M to be processed are adsorbed and removed in the adsorption zone and, at the same time, the adsorbing member which has adsorbed the organic solvents is regenerated in the regeneration zone. The adsorbing member-regeneration air P used for regenerating the adsorbing member is discharged from the adsorber 51 as a concentrated air containing high-concentration organic solvents. The concentrated air is supplied to the combustion furnace 52 via a concentrated air feed pipe 53. The organic solvents in the concentrated air are burnt in the combustion furnace 52 to remove the organic solvents in the concentrated air and an exhaust gas Q is discharged from the combustion furnace 52.

In this manner, in the conventional method of processing an organic solvent-containing air, an adsorption-treated air N produced by processing an air G to be processed in the adsorber 51 and the exhaust gas Q from the combustion furnace are discharged to the atmosphere.

Because the organic solvents burn by being catalyzed with an oxidation catalyst in the combustion furnace, an enormous heat is generated and the oxidation catalyst is exposed to a high temperature. Since a platinum catalyst, of which the upper limit of the operating temperature is 500° C., is commonly used as the oxidation catalyst, if heated above 500° C., the oxidation catalyst decreases its performance due to deterioration by heat. Therefore, it is necessary to control the temperature of the oxidation catalyst in a range not exceeding 500° C. The temperature of the oxidation catalyst is controlled by detecting the temperature of the combustion furnace exhaust gas and adjusting the temperature of the air supplied to the combustion furnace according to the temperature of the exhaust gas. The temperature of the air supplied to the combustion furnace is usually in a range of 250° C. to 300° C.

The organic solvents can be burnt only incompletely in the combustion furnace if the concentration of the organic solvents in the air supplied to the combustion furnace is too high. That is, there is an upper limit to the concentration (content) of the organic solvents in the air which can be processed by the combustion furnace.

It is natural that the concentration of the organic solvents in the organic solvent-containing air discharged from the production processes and the like, namely, the concentration of the organic solvents in the air to be processed, fluctuates. If the concentration of the organic solvents in the air to be processed increases, the concentration of the organic solvents in the air processed in the combustion furnace also increases. When the increase in the concentration of the organic solvents in the air supplied to the combustion furnace is small, the concentration of the organic solvent can be lowered by introducing external air to reduce the concentration to a level not exceeding the process limit concentration of the combustion furnace. In regard to the fluctuation of the concentration which may cause trouble in the process, an increase of the concentration is so great that the concentration of the organic solvents must be reduced by introducing a great amount of external air. However, since there is a limitation to the throughput of a combustion furnace, the amount of external air to be introduced is limited. Thus, the problem could not be obviated in some cases by introducing an external air.

In such a case, an organic solvent-containing air with a concentration exceeding the process limit concentration of the combustion furnace is supplied to the combustion furnace. It is impossible for the combustion furnace alone to completely burn the organic solvent, in which case an unburned organic solvent may mix into the combustion furnace exhaust gas. For this reason, an exhaust gas containing an unburned organic solvent may be emitted into the atmosphere from the combustion furnace.

Moreover, since the combustion furnace exhaust gas may contain the unburned organic solvent even at a high temperature, it was impossible to use the combustion furnace exhaust gas for regenerating the dehumidifying member which has adsorbed moisture. Therefore, an air with a low content of organic solvents, such as an external air, must be heated and caused to flow through the dehumidifying member. For this reason, the conventional method had a problem of extremely poor thermal efficiency.

Accordingly, an object of the present invention is to provide a method for processing an organic solvent-containing air which can be operated in spite of a rapid fluctuation of the concentration of organic solvents in the air to be processed, that is, a method capable of being operated without accompanying an increase in the organic solvent content in the air to be discharged into the atmosphere after processing, even if the concentration of organic solvents rapidly fluctuates, and capable of using a combustion furnace exhaust gas as an air for regenerating dehumidifying member, thereby ensuring high thermal efficiency.

SUMMARY OF THE INVENTION

As a result of extensive research in order to achieve the above object, the present inventors have found that (1) if an absorption-treated air processed by an adsorber and a combustion furnace exhaust gas processed by a combustion furnace are mixed and the mixture is decomposed by oxidation using an oxidation-decomposition filter or the like, a stable operation can be ensured without increasing the content of the organic solvents in the purified air, even if the content of the organic solvents in the exhaust gas of the combustion furnace rapidly changes and that (2) because the purified air can be used as an air for regenerating a dehumidifying member, thermal efficiency can be improved. This finding has led to the completion of the present invention.

Specifically, the present invention (1) provides a method for processing an organic solvent-containing air comprising carrying out simultaneously and continuously a dehumidification step (a) comprising causing an air to be dehumidified to flow through a dehumidifying member to remove moisture in the air to be dehumidified, an adsorption-removing step (b) comprising causing the dehumidified air containing organic solvents to flow through an adsorbing member to remove the organic solvents by adsorption, an adsorbing member-regeneration step (c) comprising causing an adsorbing member-regeneration air to flow through the adsorbing member which has adsorbed organic solvents to regenerate the adsorbing member, a combustion step (d) comprising supplying a concentrated air produced in the adsorbing member-regeneration step to a combustion furnace and burning the organic solvents in the concentrated air, and a dehumidifying member-regeneration step (e) comprising mixing the adsorption-treated air produced in the adsorbing-removing step (b) with a combustion furnace exhaust gas produced in the combustion step (d) to obtain a mixed gas, decomposing the organic solvents in the mixed gas by oxidation, and causing the resulting purified gas to flow through the dehumidifying member which has adsorbed moisture, thereby regenerating the dehumidifying member.

The invention (2) provides a method for processing an organic solvent-containing air according to the invention (1), comprising introducing an external air into the combustion furnace and mixing with the combustion furnace exhaust gas and, at the same time, extracting a part of the combustion furnace exhaust gas, and returning the extracted gas as the regeneration air for regenerating the absorbing component.

According to the method for processing an organic solvent-containing air of the present invention, a method capable of being operated in spite of a rapid fluctuation of the concentration of organic solvents in the air to be processed can be provided. Specifically, according to the method of the present invention, not only a rapid fluctuation of the concentration of organic solvents in the air to be processed does not accompany an increase in the organic solvent content in the air to be emitted into the atmosphere after processing, but also the combustion furnace exhaust gas can be used as an air for regenerating dehumidifying member, thereby ensuring increasing high thermal efficiency.

DETAILED DESCRIPTION OF THE INVENTION AND PREFERRED EMBODIMENTS

The method for processing an organic solvent-containing air comprises carrying out simultaneously and continuously a dehumidification step (a) comprising causing an air to be dehumidified to flow through a dehumidifying member to remove moisture in the air to be dehumidified, an adsorption-removing step (b) comprising causing the dehumidified air containing organic solvents to flow through an adsorbing member to remove the organic solvents by adsorption, an adsorbing member-regeneration step (c) comprising causing an adsorbing member-regeneration air to flow through the adsorbing member which has adsorbed organic solvents to regenerate the adsorbing member, a combustion step (d) comprising supplying a concentrated air produced in the adsorbing member-regeneration step to a combustion furnace and burning the organic solvents in the concentrated air, and a dehumidifying member-regeneration step (e) comprising mixing the adsorption-treated air produced in the adsorbing-removing step (b) with an combustion furnace exhaust gas produced in the combustion step (d) to obtain a mixed gas, decomposing the organic solvents in the mixed gas by oxidation, and causing the resulting purified gas to flow through the dehumidifying member which has adsorbed moisture, thereby regenerating the dehumidifying member.

Figure 1:
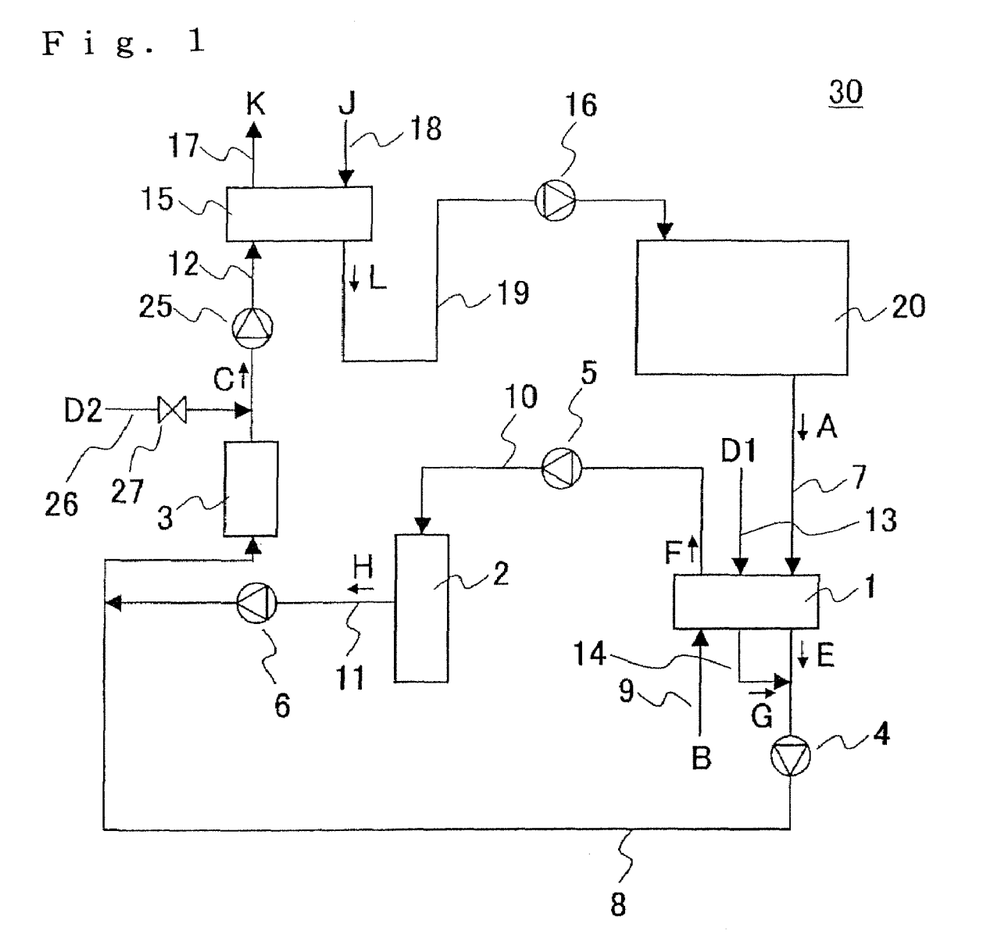
FIG. 1 is a flow chart showing an embodiment of carrying out the method for processing an organic solvent-containing air of the present invention.

The method for processing an organic solvent-containing air of the present invention will be described with reference to FIG. 1. FIG. 1 is a flow chart showing an embodiment of carrying out the method for processing an organic solvent-containing air of the present invention. In FIG. 1, an organic solvent-containing air processing system 30 has an adsorber 1, in which organic solvents in the air A to be processed are adsorbed and removed and, at the same time, an adsorbing member which has adsorbed organic solvents is regenerated, a combustion furnace 2 packed with an oxidation catalyst, an oxidation-decomposition filter 3, a dehumidifier 15 for simultaneously carrying out dehumidification of an air J to be dehumidified and regeneration of the dehumidifying member which has absorbed moisture, a pipe 7 for supplying the air to be processed connecting a production plant 20 with an adsorption zone of the adsorber 1, an adsorption-treated air feed pipe 8 connecting the adsorption zone of the adsorber 1 with the oxidation-decomposition filter 3, a purging air supply pipe 13 which supplies an external air D1 to a purge zone of the adsorber 1, a purge air exhaust pipe 14 branched from the adsorption-treated air feed pipe 8 and connected to the purge zone of the adsorber 1, an adsorbing member-regeneration air supply pipe 9 which supplies an adsorbing member-regeneration air B to the regeneration zone of the adsorber 1, a concentrated air feed pipe 10 which connects the adsorbing member-regeneration zone of the adsorber 1 with the combustion furnace 2, a combustion furnace exhaust gas feed pipe 11 branched from the adsorption-treated air feed pipe 8 and connected to the combustion furnace 2, a purified air supply pipe 12 which connects the oxidation-decomposition filter 3 with the dehumidifier 15, a first external air supply pipe 26 branched from the purified air supply pipe 12 and provided with a first valve 27, an air discharge pipe 17 for discharging moistened purified air K from the dehumidifier 15 to the atmosphere, a pipe 18 for supplying air to be dehumidified which supplies an air J to be dehumidified to the dehumidifier 15, and a dehumidified air supply pipe 19 which connects the dehumidifier 15 with the production plant 20. A first air blower 4 is installed in the adsorption-treated air feed pipe 8, a second air blower 5 is installed in the concentrated air feed pipe 10, a third air blower 6 is installed in the combustion furnace exhaust gas feed pipe 11, a fourth air blower 16 is installed in the dehumidified air supply pipe 19, and a fifth air blower 25 is installed in the purified air supply pipe 12.

The dehumidification step (a) comprises, for example, supplying the air J to be dehumidified, such as an external air, to the dehumidification zone of the dehumidifier 15 by suctioning the air using the fourth air blower 16 and causing the moisture in the air J to be dehumidified by the dehumidifying member of the dehumidifier 15. When passing through the dehumidifier 15, the moisture is removed from the air J and the air from which the moisture has been removed is discharged from the dehumidifier 15 as a dehumidified air L. The dehumidified air L is sent to the production plant 20 using the fourth air blower 16. The temperature of the air J to be dehumidified when supplied to the dehumidifier 15 is usually from 0° C. to 50° C., and preferably from 15° C. to 30° C. The temperature of the dehumidified air L is usually from 40° C. to 100° C. An air-conditioner for cooling the dehumidified air is optionally installed in the dehumidified air supply pipe 19.

The dehumidified air L is supplied to the production plant, while the air containing organic solvents is exhausted from the production plant 20 and processed by the adsorption-removing step (b) which comprises feeding the air A to be processed containing organic solvents to the adsorption zone of the adsorber 1 by suctioning the air using the first air blower 4 and causing the organic solvents in the air A to be processed to be adsorbed by the adsorbing member of the adsorber 1. When passing through the adsorber 1, the organic solvents are removed from the air A and the air from which the organic solvent has been removed is discharged from the adsorber 1 as an adsorption-treated air E. The adsorption-treated air E is sent to the oxidation-decomposition filter 3 using the first air blower 4. The temperature of the air A to be processed when supplied to the adsorber 1 is usually from 20° C. to 50° C., and preferably from 20° C. to 30° C. The temperature of the adsorption-treated air E is usually from 20° C. to 60° C. In the organic solvent-containing air processing system 30 shown in FIG. 1, the adsorbing member of the adsorber 1 is provided with a purge zone and the external air D1 is supplied to the purge zone to cool the adsorbing member heated in the regeneration zone of the adsorber 1, and exhaust gas G from the purge zone is sent from the purge air exhaust pipe 14 and mixed with the adsorption-treated air. However, it is optional to provide the purge zone to perform the purging operation.

The adsorbing member-regeneration step (c) is then carried out, in which the adsorbing member-regeneration air B is supplied to the regeneration zone of the adsorber 1 by suctioning the air using the second air blower 5 and the organic solvents adsorbed by the adsorbing member of the adsorber 1 are sent to the adsorbing member-regeneration air, whereby the adsorbing member is regenerated. When passing through the adsorber 1, the adsorbing member-regeneration air B receives the organic solvents from the adsorbing member and is removed from the adsorber 1 as a concentrated air F containing the organic solvents. The concentrated air F is sent to the combustion furnace 2 using the second air blower 5. The temperature of the adsorbing member-regeneration air B supplied to the adsorber 1 is usually from 120° C. to 300° C., and preferably from 180° C. to 200° C.

Next, in the combustion step (d), the concentrated air F is supplied to the combustion furnace 2 and the organic solvents in the concentrated air F are burnt. The organic solvents in the concentrated air F are removed by burning in the combustion step. The temperature of the concentrated air F when supplied to the combustion furnace 2 is usually from 30° C. to 70° C., and the temperature of a combustion furnace exhaust gas H is usually from 300° C. to 600° C.

The combustion furnace exhaust gas H produced in the combustion step (d) is sent to the adsorption-treated air feed pipe 8 by the third air blower 6 and mixed with the adsorption-treated air E to obtain a mixed gas, from which the organic solvents are removed by oxidation-decomposition using the oxidation-decomposition filter 3. The mixed air passing through the oxidation-decomposition filter 3 is a purified air C, which is supplied to the regeneration zone of the dehumidifier 15 via the purified air supply pipe 12. The temperature of the mixed air supplied to the oxidation-decomposition filter 3 is usually in a range of 100° C. to 150° C. By mixing the combustion furnace exhaust gas H with the adsorption-treated air E, the temperature of the mixed air is adjusted to a prescribed temperature. In addition, the temperature of the mixed air can be controlled by mixing with external air.

The dehumidifying member regeneration step (e) is then carried out, in which the purified air C is supplied to the regeneration zone of the dehumidifier 15 using the fifth air blower 25 and moisture in the dehumidifying member is transferred to the purified air C, thereby regenerating the dehumidifying member. When passing through the dehumidifier 15, the purified air C receives moisture from the dehumidifying member and is discharged from the dehumidifier 15 as a discharge air K. The temperature of the purified air C supplied to the dehumidifier 15 is usually from 100° C. to 180° C., and preferably from 120° C. to 140° C. The purified air C can be adjusted to a prescribed temperature by mixing the external air D2 before the purified air C is supplied to the dehumidifier 15.

It is possible to supply dehumidified air to the production plant 20, while processing the organic solvent-containing air discharged from the production plant by simultaneously and continuously carrying out the dehumidification step (a), adsorption-removing step (b), adsorbing member-regeneration step (c), combustion step (d), and dehumidifying member-regeneration step (e).

In the method for processing the organic solvent-containing air of the present invention, because the combustion furnace exhaust gas is mixed with the adsorption-treated air with a small content of organic solvents, the change in the organic solvent content of the mixed air is small even if the content of organic solvents in the combustion furnace exhaust gas rapidly increases due to trouble in the process. Therefore, the content of the organic solvents in the mixed air does not exceed the processing capacity of the oxidation-decomposition filter during process trouble, enabling the oxidation-decomposition filter to appropriately deal with the trouble to avoid an increase of the organic solvent in the purified air. Accordingly, the content of organic solvents in the discharged air emitted into the atmosphere, as well as fluctuation of the organic solvent content, is very small in the method for processing the organic solvent-containing air of the present invention.

Moreover, since the temperature of the mixed air to be supplied to the oxidation-decomposition filter is usually about 100° C. to 150° C., the temperature of the adsorption-treated air is usually about 30° C. to 50° C., and the temperature of the combustion furnace exhaust gas is usually about 300° C. to 600° C., the mixed air can be brought to a predetermined temperature without heating it, ensuring a high heat efficiency of the process.

In addition, since the adsorption-treated air can also be processed by the oxidation-decomposition filter, it is possible to reduce the content of the organic solvent in the discharged air as compared with a conventional treating system of an organic solvent-containing air.

Moreover, since the purified air discharged from the oxidation-decomposition filter (i) has usually a temperature of about 100° C. to 150° C., which is higher than the temperature necessary for regenerating the dehumidifying member, (ii) contains only a small amount of organic solvents, and (iii) does not increase its organic solvent content due to trouble in the process and the like, the purified air can be used as the air for regenerating the dehumidifying member. For this reason, it is unnecessary in the method of processing an organic solvent-containing air of the present invention to heat an external air or the like and supply the heated air for regenerating the dehumidifying member. Therefore, the method has high thermal efficiency.

Figure 2:
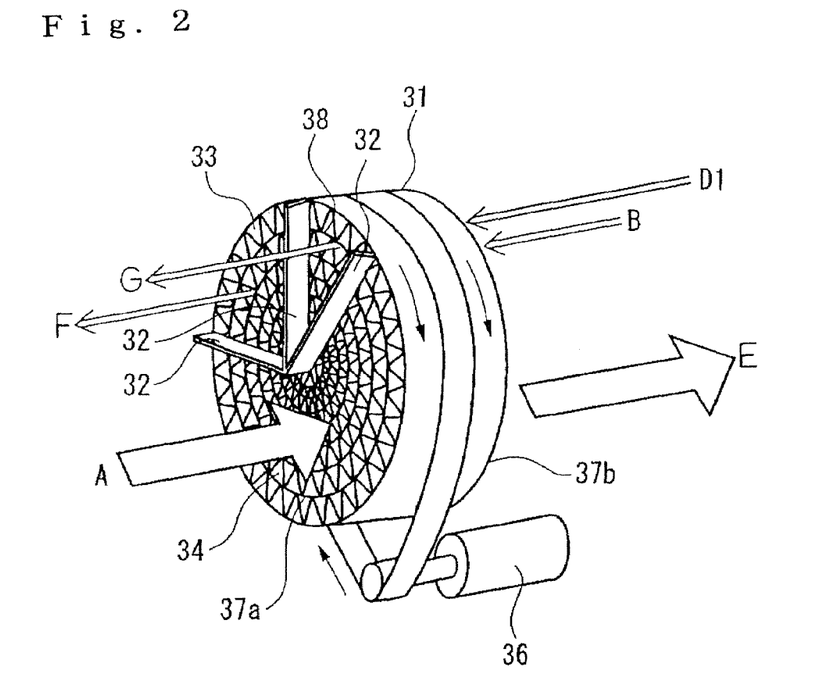
FIG. 2 is a schematic diagram showing an adsorbing member installed in an adsorber.

An adsorbing member 31 shown FIG. 2 is provided inside the adsorber 1. The adsorbing member 31 has aeration holes for allowing the air A to be processed, the adsorbing member-regeneration air B, and the external air D1 for purging to flow therethrough. An adsorbent such as zeolite is supported on the adsorbing member 31. The adsorbing member 31 is divided into an adsorption zone 34, a regeneration zone 33, and a purge zone 38 by a diaphragm 32 on an opening side 37a to which the air to be processed is supplied and an opening side 37b to which the adsorbing member-regeneration air is supplied. The adsorbing member is attached to the adsorber 1 by a rotor shaft (not shown) in a manner that the adsorbing member can be rotated by a motor 36.

When the air A to be processed is caused to pass through the adsorption zone 34 from the opening side 37a, the organic solvents in the air A to be processed are adsorbed by an adsorbent supported on the adsorbing member 31. An adsorption-treated air E from which the organic solvents have been removed by adsorption is discharged from the opening side 37b. The adsorbent which adsorbed the organic solvents is forwarded to the regeneration zone 33 by rotating the adsorbing member 31 by a motor 36. The organic solvents are moved from the adsorbent to the adsorption component regeneration air B by causing heated adsorption component regeneration air B to flow to the regeneration zone 33 from the opening side 37b, whereby the adsorbent is regenerated and the concentrated air F containing the organic solvents is discharged from the opening side 37a. Next, the adsorbing member 31 is rotated by the motor 36 and the regenerated adsorbent is moved to the purge zone 38 and cooled by the external air D1. Then, the cooled adsorbing member moves to the adsorption zone 34 again.

There are no specific limitations to the material used for the adsorbing member 31. For example, an adsorbing member made from a porous fiber carrier obtainable by forming woven or nonwoven fabrics of fibers such as ceramic fiber and glass fiber into a corrugated honeycomb structure on which an absorbent is supported and an adsorbing member made from a metal honeycomb carrier obtainable by forming a metal foil such as an aluminum foil into a corrugated honeycomb structure on which an absorbent is supported can be given. Examples of the adsorbent include, but are not limited to, zeolite, activated carbon, silica gel, and activated alumina.

There are no specific limitations to the oxidation catalyst packed in the combustion furnace 2. As an example, a catalyst made from a cordierite carrier on which platinum, palladium, manganese, or iron is supported can be given.

In the system 30 for processing an organic solvent-containing air shown in FIG. 1, an oxidation filter is used for oxidation-decomposition of the organic solvent in the mixed air. As an example of the oxidation filter, a catalyst comprising a carrier such as a porous ceramic (e.g. alumina, silica), carbon fiber, carbon paper, or the like and a metal catalyst such as a noble metal (e.g. platinum) or a transition metal (e.g. palladium, manganese, nickel), supported on the carrier, either individually or in combination, can be given. These examples are by no means restrictive. Other oxidation filter materials such as activated carbon, zeolite, silica gel, and activated alumina can also be given.

Figure 3:
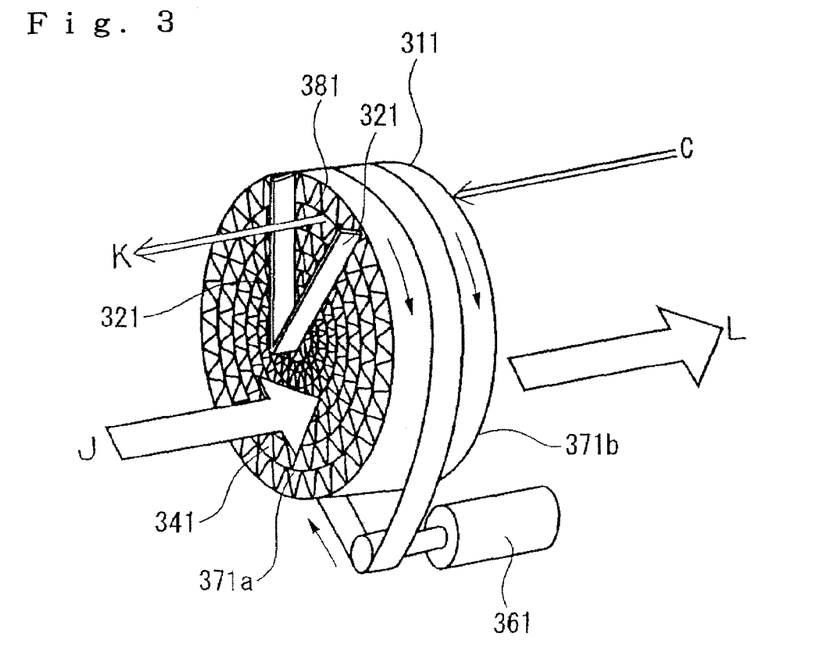
FIG. 3 is a schematic diagram showing a dehumidifying member installed in a dehumidifier.

The dehumidifying member 311 shown FIG. 3 is provided inside the dehumidifier 15. The dehumidifying member 311 has aeration holes for allowing the air J to be dehumidified and the purified air C to pass through. In addition, the dehumidifying member 311 has a dehumidification agent such as zeolite supported thereon. The dehumidifying member 311 is divided into a dehumidification zone 341 and a regeneration zone 341 by a diaphragm 321 on an opening side 371a to which the air to be dehumidified is supplied and an opening side 371b to which the purified air is supplied. The dehumidifying member is attached to the dehumidifier 15 by a rotor shaft (not shown) in a manner that the dehumidifying member can be rotated by a motor 361.

When the air J to be dehumidified is caused to pass through the dehumidification zone 341 from the opening side 371a, the moisture in the air J to be dehumidified is adsorbed by a dehumidification agent supported on the dehumidifying member 311. A dehumidified air L from which the moisture has been removed is discharged from the opening side 371b. The dehumidification agent which adsorbed the moisture is forwarded to the dehumidification zone 381 by rotating the dehumidifying member 311 by a motor 361. The moisture is moved from the dehumidification agent to the purified air C by causing purified air C to flow to the regeneration zone 381 from the opening side 371b, whereby the dehumidification agent is regenerated and the discharge air K containing the moisture is discharged from the opening side 371a. Then, the regenerated dehumidification agent moves to the dehumidification zone 341 again.

There are no specific limitations to the material used for the dehumidifying member 311. For example, a dehumidifying member made from a porous fiber carrier obtainable by forming woven or nonwoven fabrics of fibers such as ceramic fiber and glass fiber into a corrugated honeycomb structure on which a dehumidification agent is supported and a dehumidifying member made from a metal honeycomb carrier obtainable by forming a metal foil such as an aluminum foil into a corrugated honeycomb structure on which a dehumidification agent is supported can be given. Examples of the dehumidification agent include, but are not limited to, zeolite, activated carbon, silica gel, and activated alumina.

The ratio of the amount of the air A to be processed to the adsorbing member-regeneration air B (air A to be processed/adsorbing member-regeneration air B) to be supplied is preferably 3 to 15, and particularly preferably 5 to 10. The ratio of the amount of the air A to be processed to the adsorbing member-regeneration air B (air A to be processed/adsorbing member-regeneration air B) to be supplied in the above range ensures the effect of the present invention of reducing the change in the organic solvent content in the discharged air according to the fluctuation of the organic solvent content in the air to be processed.

Figure 4:
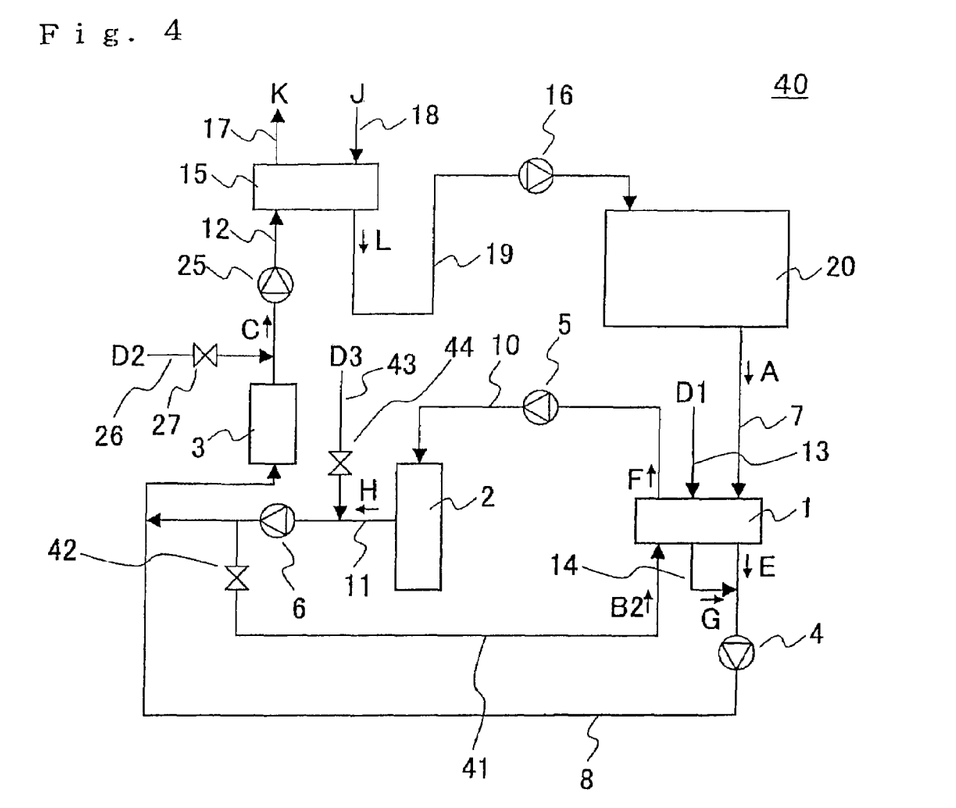
FIG. 4 is a flow chart showing an embodiment of the method for processing an organic solvent-containing air of the present invention, in which an exhaust gas from a combustion furnace is returned as a regeneration air.

In addition, in the method for processing an organic solvent-containing air according to the present invention, as shown in FIG. 4, it is possible to introduce external air into the combustion furnace exhaust gas and mix the external air with the combustion furnace exhaust gas and, at the same time, to extract a part of the combustion furnace exhaust gas, and return the extracted gas as the adsorbing member-regeneration air. FIG. 4 is a flow chart showing an embodiment of the method for processing an organic solvent-containing air of the present invention, in which an exhaust gas from a combustion furnace is returned as an adsorbing member-regeneration air. The organic solvent-containing air processing system 40 is the same as the organic solvent-containing air processing system 30, except that the organic solvent-containing air processing system 40 is equipped with a second external air supply pipe 43 branched from the combustion furnace exhaust gas feed pipe 11 at a point after the combustion furnace 2 and a combustion furnace exhaust gas return pipe 41 branched from the combustion furnace exhaust gas feed pipe 11 at a point after the branched point of the second external air supply pipe 43 and connected to the regeneration zone of the adsorber 1. A second valve 44 is installed in the second external air supply pipe 43 and a third valve 42 is installed in the combustion furnace exhaust gas return pipe 41.

A part of the combustion furnace exhaust gas (hereinafter referred to from time to time as "returned combustion furnace exhaust gas B2") is extracted from the combustion furnace exhaust gas feed pipe 11 by adjusting the third valve 42 and returned to the regeneration zone of the adsorber 1 as adsorbing member-regeneration air, which is used in the dehumidification step (a), adsorption-removing step (b), adsorbing member-regeneration step (c), combustion step (d), dehumidifying member regeneration step (e). Furthermore, concurrently with returning the combustion furnace exhaust gas, the second valve 44 is adjusted to introduce an external air D3 in approximately the same amount as the amount of the combustion furnace exhaust gas returned. The introduced external air D3 is introduced from the third external air supply pipe and mixed with the combustion furnace exhaust gas.

If the concentration of the organic solvents in the air to be processed rapidly increases due to process trouble or the like, the concentration of the organic solvent in the combustion furnace exhaust gas also increases. However, the concentration of the organic solvents in the combustion furnace exhaust gas in this instance, however, is small enough to the extent that there may be no problem for use as the regeneration air of the adsorbing member. The combustion furnace exhaust gas (the returned combustion furnace exhaust gas B2) can thus be used as the regeneration air.

Since the regeneration air used for regenerating the adsorbing member of the adsorber 1 is usually at a temperature of 180 to 300° C., external air must be heated before being supplied to the absorber 1, if used as the adsorbing member-regeneration air. However, when the combustion furnace exhaust gas is retuned and used as the adsorbing member-regeneration air, heating is unnecessary, because the temperature of the combustion furnace exhaust gas at 300 to 600° C. is adjusted with the external air. Therefore, returning a part of the combustion furnace exhaust gas as the adsorbing member-regeneration air is advantageous from the viewpoint of heat efficiency.

The present invention will be described in more detail by examples, which should not be construed as limiting the present invention.

EXAMPLES

Example 1

An organic solvent-containing air was processed using the organic solvent-containing air processing system shown in FIG. 4 under the conditions shown in Table 1, provided that installation of the production plant 20 was omitted and an air of which the content of organic solvents was adjusted was directly introduced as the air A to be processed into the pipe 7 for supplying air to be processed. The results are shown in Table 2.

Adsorber 1
    Carrier: A rotor-shaped honeycomb structural carrier with a diameter of 400 mm and a length in the air-flow direction of 400 mm, made from silica-alumina fiber paper (thickness: 0.2 mm, void ratio: 90%) was prepared.
    Supported adsorbent: ZSM-5 zeolite (composition: $Al_{0.64}Si_{95.36}O_{192}$)
    Ratio of adsorption zone, regeneration zone, and purge zone: 3:1:1

Combustion furnace 2
    Packed catalyst: Cordierite-supported platinum catalyst
    Packed bed: diameter: 0.5 m, length: 1 m Oxidation-decomposition filter 3
    Porous ceramic-supported nickel
    Diameter: 0.5 m, thickness: 100 mm Dehumidifier 15
    Carrier: A rotor-shaped honeycomb structural carrier with a diameter of 400 mm and a length in the air-flow direction of 400 mm, made from silica-alumina fiber paper (thickness: 0.2 mm, void ratio: 90%) was prepared.
    Supported adsorbent: A-type zeolite (composition: $Al_{12}Si_{12}O_{48}$)
    Ratio of adsorption zone and regeneration zone: 3:1

TABLE 1

| | |
|---|---:|
| Adsorber 1 | |
| Air supplied to adsorption zone (air A to be processed) | |
| Organic solvents contained | [1] |
| Amount of organic solvents (g/m$^3$) | 0.0021 |
| Supplying temperature (° C.) | 30 |
| Supply amount (m$^3$/min) | 50 |
| Air supplied to regeneration zone (returned exhaust gas B2 from combustion furnace) | |
| Supplying temperature (° C.) | 180 |
| Supply amount (returned amount) (m$^3$/min) | 5 |
| Combustion furnace 2 | |
| Concentrated air supplying temperature (° C.) | 50 |
| Concentrated air supply amount (returned amount) (m$^3$/min) | 5 |
| Temperature of catalyst bed (° C.) | 300 |
| Oxidation-decomposition filter 3 | |
| Mixed air supplying temperature (° C.) | 100 to 150 |
| Mixed air supply amount (m$^3$/min) | 65 |
| Dehumidifier 15 | |
| Air supplied to dehumidification zone (air J to be dehumidified) | |
| Supplying temperature (° C.) | 30 |
| Supply amount (m$^3$/min) | 15 |
| Air supplied to regeneration zone (purified air C) | |
| Supplying temperature (° C.) | 180 |
| Supply amount (m$^3$/min) | 5[2] |
| External air D1 (purge zone) | |
| External air D1 supplying temperature (° C.) | 30 |
| External air D1 supply amount (m$^3$/min) | 5 |
| External air D2 (first external air supply pipe 26) | |
| External air D2 supplying temperature (° C.) | 30 |
| External air D2 supply amount (m$^3$/min) | 5 |
| External air D3 (second external air supply pipe 43) | |
| External air D3 supplying temperature (° C.) | 30 |
| External air D3 supply amount (m$^3$/min) | 5 |

[1] Organic solvent contained: toluene, isopropylamine, methyl ethyl ketone, and ethyl acetate
[2] 5 m$^3$ of purified air C discharged from the oxidation decomposition filter 3 was sent to the dehumidifier 15, and the balance was discharged to the atmosphere.

TABLE 2

| | |
|---|---:|
| Dehumidified air L | |
| Amount of organic solvents (g/m$^3$) | 0 |
| Temperature (° C.) | 30 |
| Adsorption-treated air E | |
| Amount of organic solvents (g/m$^3$) | 0 |
| Temperature (° C.) | 30 |
| Combustion furnace exhaust gas B2 returned to regeneration zone of adsorber 1 | |
| Amount of organic solvents (g/m$^3$) | 0 |
| Temperature (° C.) | 180 |
| Concentrated air F on the outlet port side of adsorber 1 | |
| Amount of organic solvents (g/m$^3$) | 0.176 |
| Temperature (° C.) | 30 |
| Exhaust air H on the outlet port side of combustion furnace 2 | |
| Amount of organic solvents (g/m$^3$) | 0 |
| Temperature (° C.) | 300 to 600 |
| Purified air C (outlet port side of oxidation filter 3) | |
| Amount of organic solvents (g/m$^3$) | 0 |
| Temperature (° C.) | 50 |
| Discharge air K (outlet port side of dehumidifier 15) | |
| Amount of organic solvents (g/m$^3$) | 0 |
| Temperature (° C.) | 50 |

What is claimed is:

1. A method for processing an organic solvent-containing air comprising carrying out simultaneously and continuously a dehumidification step (a) comprising causing an air to be dehumidified to flow through a dehumidifying member to remove moisture in the air to be dehumidified, an adsorption-removing step (b) comprising causing the dehumidified air containing organic solvents to flow through an adsorbing member to remove the organic solvents by adsorption, an adsorbing member-regeneration step (c) comprising causing an adsorbing member-regeneration air to flow through the adsorbing member which has adsorbed organic solvents to regenerate the adsorbing member, a combustion step (d) comprising supplying a concentrated air produced in the adsorbing member-regeneration step to a combustion furnace and burning the organic solvents in the concentrated air, and a dehumidifying member-regeneration step (e) comprising mixing the adsorption-treated air produced in the adsorbing-removing step (b) with a combustion furnace exhaust gas produced in the combustion step (d) to obtain a mixed gas, decomposing the organic solvents in the mixed gas by oxidation, and causing the resulting purified gas to flow through the dehumidifying member which has adsorbed moisture, thereby regenerating the dehumidifying member.

2. A method for processing an organic solvent-containing air according to claim 1, comprising introducing an external air into the combustion furnace and mixing with the exhaust gas of the combustion furnace and, at the same time, extracting a part of the exhaust gas from the combustion furnace, and returning the extracted gas as the regeneration air.

* * * * *